United States Patent
Halfmann et al.

(10) Patent No.: US 10,683,763 B2
(45) Date of Patent: Jun. 16, 2020

(54) TURBINE BLADE WITH INTEGRAL FLOW METER

(71) Applicant: HONEYWELL INTERNATIONAL INC., Morris Plains, NJ (US)

(72) Inventors: Steve Halfmann, Chandler, AZ (US); Daniel C. Crites, Mesa, AZ (US); Michael Kahrs, Phoenix, AZ (US); Ardeshir Riahi, Scottsdale, AZ (US); Jude Miller, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 671 days.

(21) Appl. No.: 15/285,347

(22) Filed: Oct. 4, 2016

(65) Prior Publication Data
US 2018/0094527 A1 Apr. 5, 2018

(51) Int. Cl.
*F01D 5/18* (2006.01)
*F01D 5/08* (2006.01)

(52) U.S. Cl.
CPC ............ *F01D 5/187* (2013.01); *F01D 5/081* (2013.01); *F01D 5/082* (2013.01); *F01D 5/188* (2013.01); *F05D 2220/32* (2013.01); *F05D 2230/10* (2013.01); *F05D 2230/61* (2013.01); *F05D 2230/80* (2013.01); *F05D 2260/221* (2013.01); *Y02T 50/673* (2013.01); *Y02T 50/676* (2013.01)

(58) Field of Classification Search
None
See application file for complete search history.

(56) References Cited

U.S. PATENT DOCUMENTS

| | | | |
|---|---|---|---|
| 5,387,085 A | 2/1995 | Thomas, Jr. et al. | |
| 5,403,156 A | 4/1995 | Arness et al. | |
| 5,403,159 A * | 4/1995 | Green | F01D 5/187 416/97 R |
| 5,873,695 A * | 2/1999 | Takeishi | F01D 5/187 415/115 |
| 6,092,991 A | 7/2000 | Tomita et al. | |
| 6,139,269 A | 10/2000 | Liang | |
| 6,186,741 B1 | 2/2001 | Webb et al. | |

(Continued)

FOREIGN PATENT DOCUMENTS

| | | |
|---|---|---|
| DE | 19801804 A1 | 7/1999 |
| EP | 1598522 A1 | 11/2005 |

(Continued)

OTHER PUBLICATIONS

Extended European Search Report for Application No. 17194625.4-1006 dated Jan. 26, 2018.

*Primary Examiner* — Igor Kershteyn
*Assistant Examiner* — Jason G Davis
(74) *Attorney, Agent, or Firm* — Lorenz & Kopf, LLP

(57) ABSTRACT

A turbine blade with an integral flow meter is provided. The turbine blade includes a trailing edge and a leading edge opposite the trailing edge. The turbine blade includes at least one cooling passage defined internally within the turbine blade, and the at least one cooling passage is in fluid communication with a source of cooling fluid via an inlet to receive a cooling fluid. The turbine blade also includes at least one flow meter formed within the turbine blade at the inlet that supplies the cooling fluid to the at least one cooling passage.

11 Claims, 9 Drawing Sheets

(56) References Cited

U.S. PATENT DOCUMENTS

| | | | |
|---|---|---|---|
| 6,227,804 B1 * | 5/2001 | Koga | F01D 5/187 415/115 |
| 6,491,496 B2 | 12/2002 | Starkweather | |
| 6,746,208 B2 * | 6/2004 | Marushima | F01D 5/081 415/114 |
| 7,014,424 B2 | 3/2006 | Cunha et al. | |
| 7,097,419 B2 * | 8/2006 | Lee | F01D 5/081 415/115 |
| 7,413,406 B2 | 8/2008 | Pietraszkiewicz et al. | |
| 7,520,724 B2 * | 4/2009 | Naik | F01D 5/081 416/97 R |
| 7,568,887 B1 | 8/2009 | Liang | |
| 7,780,414 B1 | 8/2010 | Liang | |
| 7,967,563 B1 | 6/2011 | Liang | |
| 8,016,547 B2 * | 9/2011 | Propheter-Hinckley | F01D 5/188 415/115 |
| 8,043,059 B1 | 10/2011 | Liang | |
| 8,083,486 B1 | 12/2011 | Liang | |
| 8,337,158 B1 | 12/2012 | Liang | |
| 8,807,943 B1 | 8/2014 | Liang | |
| 8,827,647 B1 * | 9/2014 | Liang | F01D 5/187 416/97 R |
| 9,121,291 B2 * | 9/2015 | Hada | F01D 5/187 |
| 10,151,205 B2 * | 12/2018 | Barry | B23P 15/02 |
| 2005/0118024 A1 * | 6/2005 | Anguisola McFeat | F01D 5/186 416/97 R |
| 2015/0204194 A1 | 7/2015 | Tapia et al. | |
| 2016/0312620 A1 * | 10/2016 | Diamond | B23P 15/02 |

FOREIGN PATENT DOCUMENTS

| | | |
|---|---|---|
| EP | 1630352 A1 | 3/2006 |
| EP | 1717416 A1 | 11/2006 |
| EP | 2743454 A1 | 6/2014 |
| EP | 2924239 A1 | 9/2015 |
| EP | 3085895 A1 | 10/2016 |
| WO | 2005/068783 A1 | 7/2005 |

\* cited by examiner

TURBINE BLADE WITH INTEGRAL FLOW METER

TECHNICAL FIELD

The present disclosure generally relates to gas turbine engines, and more particularly relates to an axial turbine for use within a gas turbine engine that has one or more turbine blades with an integral flow meter.

BACKGROUND

Gas turbine engines may be employed to power various devices. For example, a gas turbine engine may be employed to power a mobile platform, such as an aircraft. In certain examples, gas turbine engines include an axial turbine that rotates at a high speed when impinged by high-energy compressed fluid. Generally, higher axial turbine inlet fluid temperature and higher axial turbine speed may be required to improve gas turbine engine efficiency. Increased speeds and higher temperatures, however, may require cooling of a turbine blade associated with the axial turbine. In certain instances, cooling may be provided via an additional external part that serves as a cooling fluid metering device, such as a plate or tube, which is coupled to the axial turbine blade. The additional part, however, may require precise alignment to ensure proper cooling of the axial turbine blade and increases cost and weight associated with the axial turbine.

Accordingly, it is desirable to provide improved cooling for an axial turbine blade using an integral flow meter, which supplies cooling fluid to the axial turbine blade without requiring additional parts. Furthermore, other desirable features and characteristics of the present invention will become apparent from the subsequent detailed description and the appended claims, taken in conjunction with the accompanying drawings and the foregoing technical field and background.

SUMMARY

According to various embodiments, a turbine blade is provided. The turbine blade includes a trailing edge and a leading edge opposite the trailing edge. The turbine blade includes at least one cooling passage defined internally within the turbine blade, and the at least one cooling passage is in fluid communication with a source of cooling fluid via an inlet to receive a cooling fluid. The turbine blade also includes at least one flow meter formed within the turbine blade at the inlet that supplies the cooling fluid to the at least one cooling passage.

Also provided according to various embodiments is a method of manufacturing a turbine blade. The method includes forming the turbine blade with at least one integral cooling passage, and the turbine blade has an inlet in fluid communication with a source of a cooling fluid and at least one integrally formed flow meter. The method includes machining at least one flow meter at the inlet to adjust a flow of the cooling fluid into the at least one cooling passage based on a determined cooling requirement for the at least one cooling passage.

Further provided according to various embodiments is a turbine blade. The turbine blade includes a trailing edge and a leading edge opposite the trailing edge. The turbine blade also includes at least a first cooling passage and a second cooling passage defined internally within the turbine blade. The first cooling passage is in fluid communication with a source of cooling fluid via an inlet defined in the turbine blade to receive a cooling fluid, and at least one flow meter is formed within the turbine blade at the inlet that supplies the cooling fluid to the second cooling passage.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of turbine blade that would benefit from an internal flow meter, and that the axial turbine blade described herein for use with a gas turbine engine is merely one exemplary embodiment according to the present disclosure. Moreover, while the turbine blade is described herein as being used with an axial turbine of a gas turbine engine onboard a mobile platform or vehicle, such as a bus, motorcycle, train, motor vehicle, marine vessel, aircraft, rotorcraft and the like, the various teachings of the present disclosure can be used with a gas turbine engine or with an axial turbine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
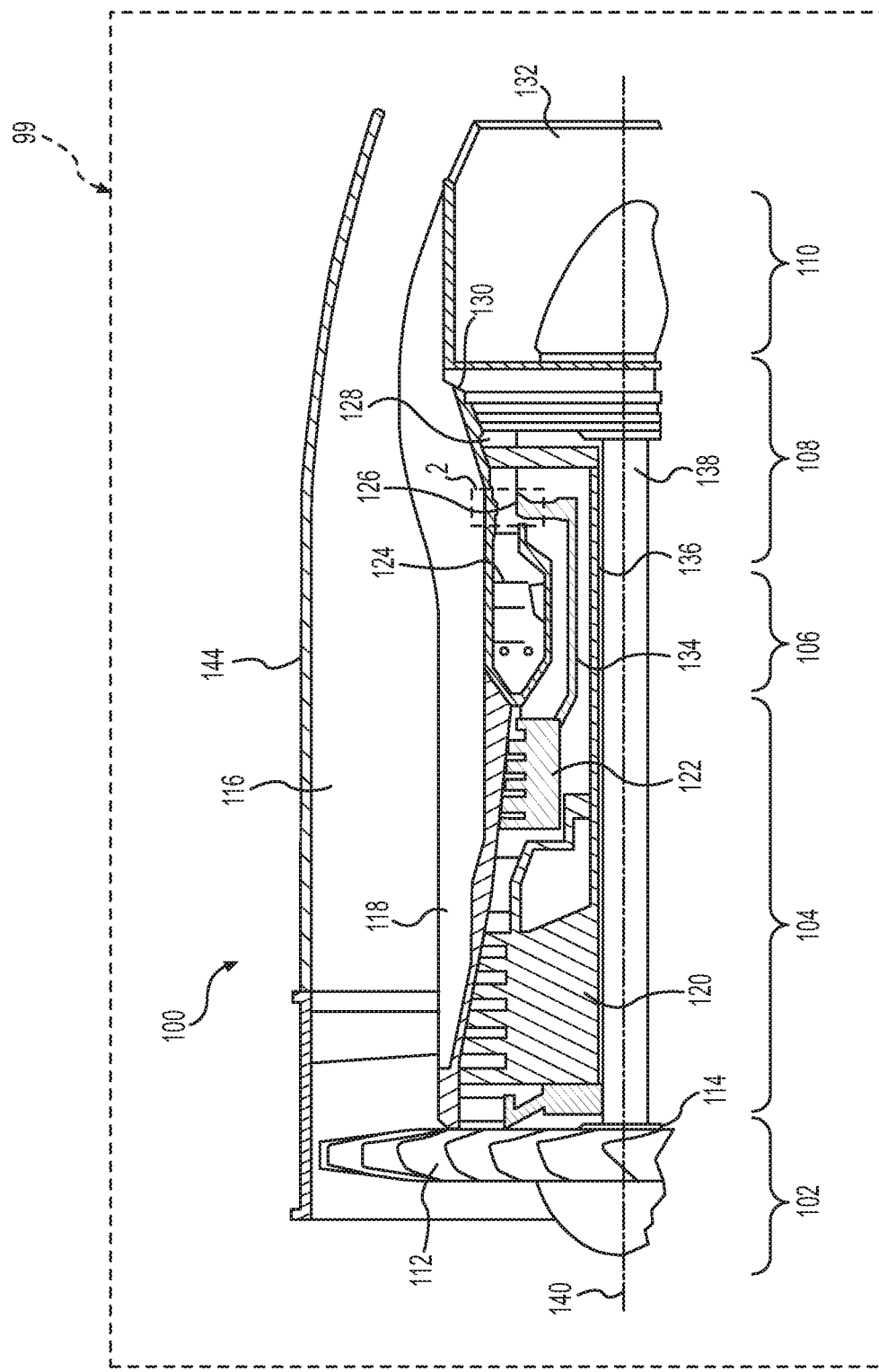
FIG. 1 is a schematic cross-sectional illustration of a gas turbine engine including an axial turbine having a turbine blade according to the various teachings of the present disclosure.

With reference to FIG. 1, a partial, cross-sectional view of an exemplary gas turbine engine 100 is shown with the remaining portion of the gas turbine engine 100 being axi-symmetric about a longitudinal axis 140, which also comprises an axis of rotation for the gas turbine engine 100. In the depicted embodiment, the gas turbine engine 100 is an annular multi-spool turbofan gas turbine jet engine 100 within an aircraft 99, although other arrangements and uses may be provided. The gas turbine engine 100 may be, for example, an auxiliary power unit ("APU"). As will be discussed herein, one or more axial turbine blades of the gas turbine engine 100 includes an integral flow meter, which supplies cooling fluid to a portion of the axial turbine blade. By using an integral flow meter, an external part is not required to meter cooling fluid to the turbine blade, thereby reducing cost and complexity associated with cooling the axial turbine blade. As used herein, the term "integral" denotes a component, such as the flow meter, which is formed within the turbine blade or defined within the turbine blade so as to be a part of the turbine blade and is not separate from the turbine blade itself. Stated another way, the term "integrally formed" and "integral" mean one-piece and excludes brazing, fasteners, or the like for coupling components in a fixed relationship as a single unit.

In this example, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108 via an inner bypass duct.

In the embodiment of FIG. 1, in the combustor section 106, which includes a combustion chamber 124, the high pressure air is mixed with fuel and combusted. The high-temperature combusted air is then directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature combusted air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
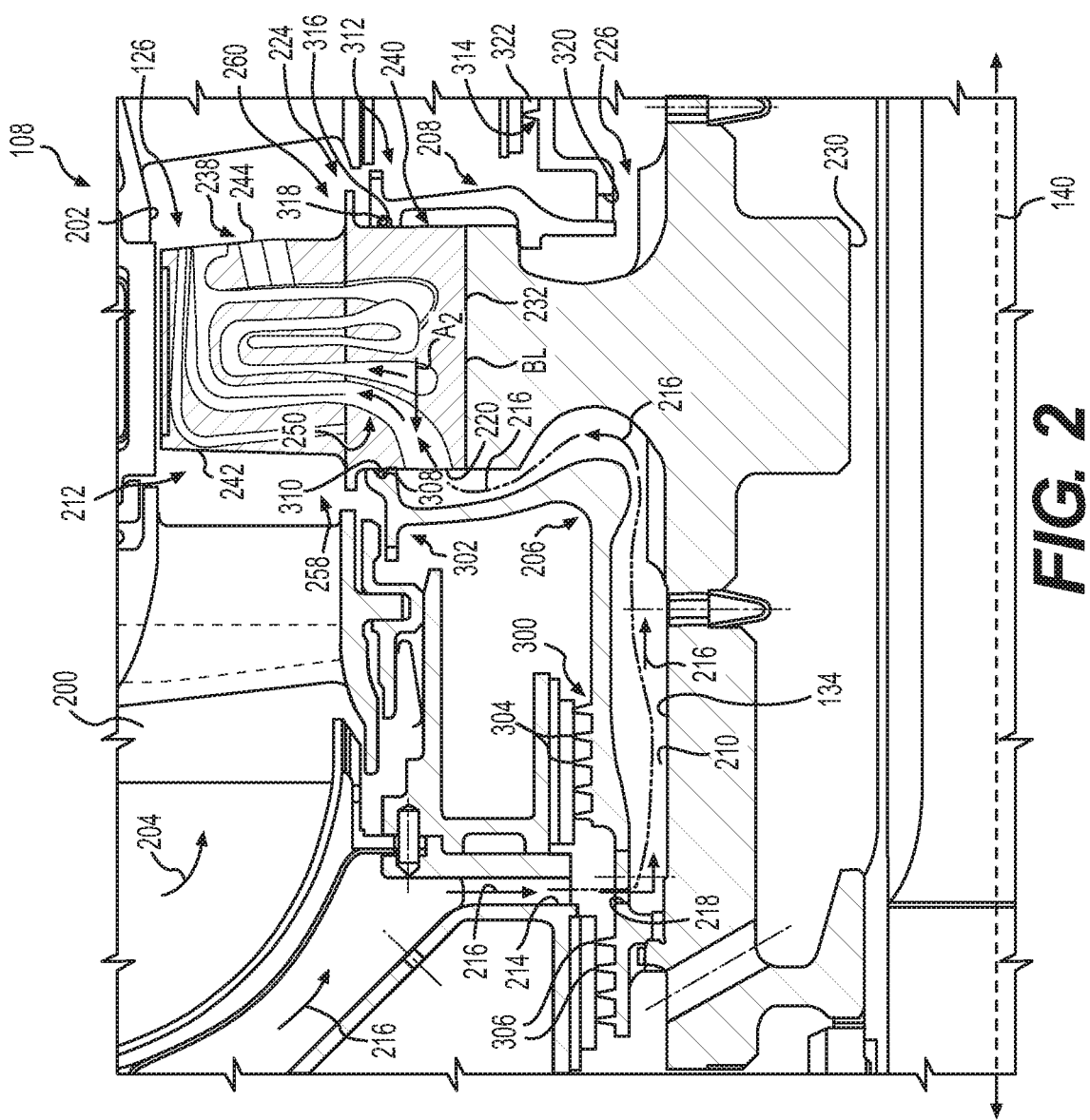
FIG. 2 is a detail cross-sectional illustration of a portion of the gas turbine engine of FIG. 1, identified at 2 in FIG. 1, which includes the axial turbine having the turbine blade, and the turbine blade includes an exemplary cooling passage having an integral flow meter, with the cross-sectional illustration taken along a surface coincident with the camber line of the turbine airfoil at all radial spans.

With reference to FIG. 2, a portion of the high pressure turbine 126 of the gas turbine engine 100 of FIG. 1 is shown in greater detail. In this example, the high pressure turbine 126 is an axial turbine. It should be understood that while the high pressure turbine 126 is described herein as comprising a dual alloy axial turbine, the high pressure turbine 126 may comprise a single alloy, which may be cast or machined, or it may be an inserted blade and disk arrangement. In addition, while the high pressure turbine 126 is illustrated herein as being used with the gas turbine engine 100, which can be included with an auxiliary power unit, the high pressure turbine 126 can be employed with various types of engines, including, but not limited to, turbofan, turboprop, turboshaft, and turbojet engines, whether deployed onboard an aircraft, watercraft, or ground vehicle (e.g., a tank), included within industrial power generators, or utilized within another platform or application.

The turbine section 108 includes a turbine duct section 200, which is in fluid communication with the combustor section 106 to receive combustive gases from the combustion chamber 124. A second turbine duct section 202 is positioned downstream from the high pressure turbine 126, and is in fluid communication with the intermediate pressure turbine 128 (FIG. 1). The second turbine duct section 202 directs the combustive gas flow 204 from the high pressure turbine 126 to the intermediate pressure turbine 128.

The combustive gas flow 204 drives rotation of the high pressure turbine 126, which drives the high pressure compressor 122. In this example, a first, forward seal plate 206 is coupled to the high pressure turbine 126 so as to be upstream from the high pressure turbine 126 in a direction of airflow, and a second, rear seal plate 208 is coupled to the high pressure turbine 126 so as to be downstream from the high pressure turbine 126 in the direction of air flow. Generally, the forward seal plate 206 at least partially defines a cooling fluid plenum 210. In this example, the cooling fluid plenum 210 receives cooling fluid or air from a source upstream from the high pressure turbine 126 and cooperates with the forward seal plate 206 to direct the cooling fluid into each of a plurality of blades 212 of the high pressure turbine 126. Thus, in this embodiment, each of the plurality of blades 212 comprise forward-fed turbine blades.

In one example, the cooling fluid plenum 210 is in fluid communication with an outlet 214, which provides cooling fluid, as indicated in FIG. 2 by arrows 216, bled from a section of the gas turbine engine 100 upstream of the combustor section 106. In this example, a portion of the airflow flowing within compressor section 104 (FIG. 1) is diverted into the inner bypass duct 118 to provide the cooling fluid 216. The cooling fluid 216 flowing from the inner bypass duct 118 is directed radially inward toward the engine centerline via the outlet 214 and an inlet 218 defined through a portion of the forward seal plate 206. From the inlet 218, the cooling fluid 216 flows axially along the high pressure shaft 134 and ultimately flows into an inlet 220 of each of the plurality of blades 212. The inlet 220 provides each of the plurality of blades 212 with cooling fluid to internally cool the plurality of blades 212.

With continued reference to FIG. 2, the high pressure turbine 126 includes a turbine rotor 224 having a hub 226 and the plurality of blades 212. The hub 226 is substantially annular about the axis of rotation or longitudinal axis 140, and is coupled to the high pressure shaft 134. In one example, the hub 226 is substantially one-piece or monolithic. In one example, the hub 226 is composed of a nickel-based superalloy, having a relatively high Low Cycle Fatigue (LCF) resistance and moderate thermal tolerance. The hub 226 defines a throughbore 230 and an outer peripheral surface 232. The throughbore 230 is generally defined near the axial centerline of the turbine rotor 224, and enables the turbine rotor 224 to be positioned about at least the intermediate pressure shaft 136 (FIG. 1). The outer peripheral surface 232 is coupled to the plurality of blades 212.

Figure 3:
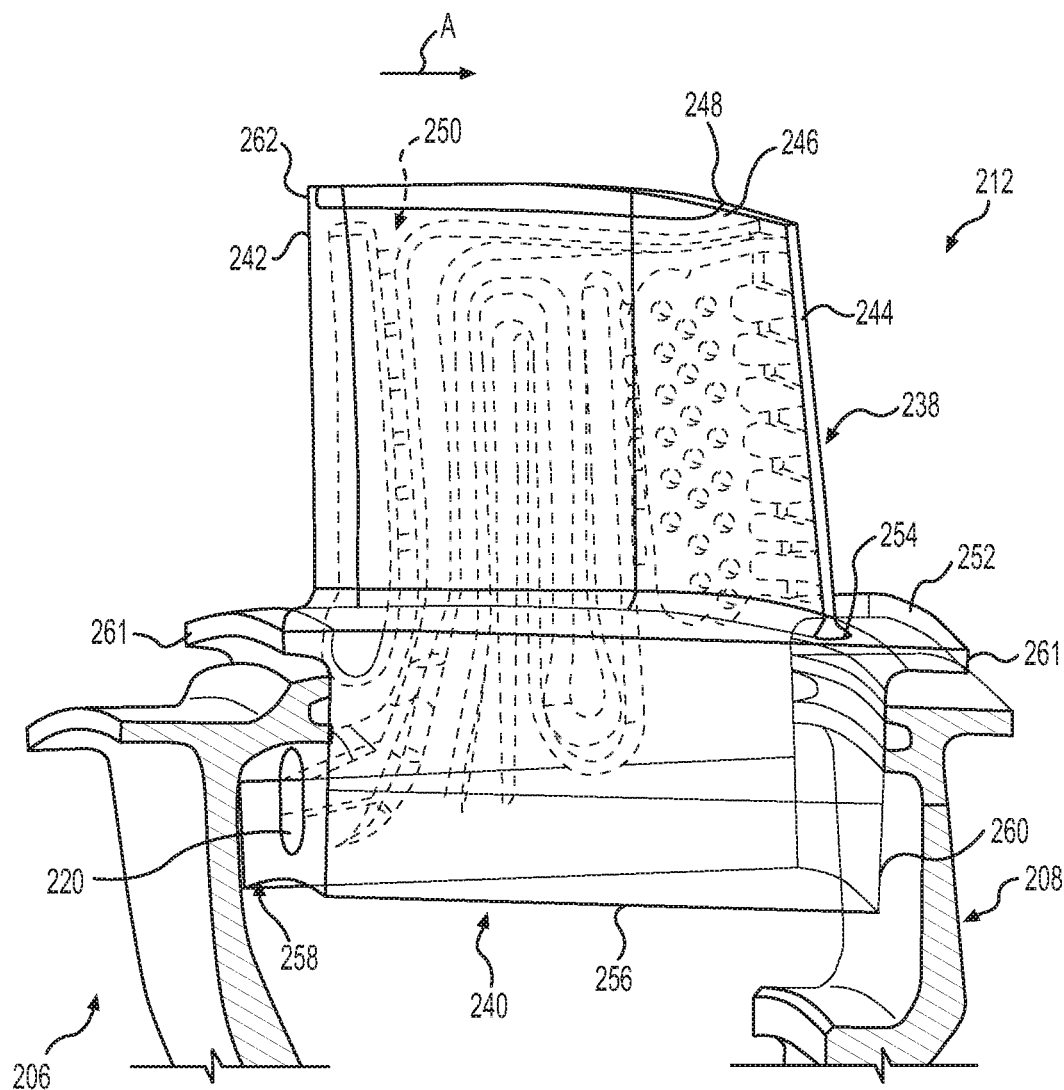
FIG. 3 is a side perspective view of the turbine blade of FIG. 2, which includes a portion of a forward seal plate and a rear seal plate.

As will be discussed further herein, each of the plurality of blades 212 is coupled to the outer peripheral surface 232 of the hub 226 so as to be spaced apart about a circumference of the hub 226. As each of the plurality of blades 212 are substantially the same or similar, for ease of description, a single blade 212 will be discussed in detail herein. With reference to FIG. 3, the blade 212 has an airfoil 238 extending outwardly from a root 240. The airfoil 238 includes a leading edge 242, a trailing edge 244, a first or pressure side 246 and a second or suction side 248. At least one cooling passage 250 is defined internally within the blade 212 and is in fluid communication with the inlet 220 to receive the cooling fluid 216. The cooling passage 250 extends from the root 240 to a tip or tip portion 262 of the airfoil 238 to direct cooling fluid through the blade 212. As will be discussed further herein, at least one flow meter is formed or defined within the blade 212 at the inlet 220 to supply the cooling fluid 216 to the at least one cooling passage 250.

A first or top surface 252 of the root 240 is coupled to a bottom surface 254 of the airfoil 238. A second or bottom surface 256 of the root 240 is in contact with the outer peripheral surface 232 of the hub 226 to couple the blade 212 to the hub 226. For example, with reference to FIG. 2, the root 240 may be metallurgically bonded to the outer peripheral surface 232 of the hub 226 via diffusion bonding along a bond line BL. It should be understood that various other techniques may be employed to couple the blade 212 to the hub 226, such as through blade attachment slots that receive the bottom surface 256 of the root 240.

The root 240 also includes a first or forward side 258 and a second or aft side 260. Each of the first side 258 and the second side 260 define annular flanges 261, which extend outwardly from the first side 258 and the second side 260 to project over the forward seal plate 206 and the rear seal plate 208. The first side 258 is coupled to the forward seal plate 206, and is upstream from the second side 260 in a direction of airflow A. The first side 258 defines the inlet 220 for the cooling passage 250. Generally, the cooling passage 250 of the blade 212 includes only a single inlet, the inlet 220. The second side 260 is coupled to the rear seal plate 208.

The leading edge 242 of the airfoil 238 extends from the tip portion 262 to the bottom surface 254. The trailing edge 244 comprises the distalmost portion of the airfoil 238. The pressure side 246 is substantially opposite the suction side 248. Each of the pressure side 246 and the suction side 248 extend along the airfoil 238 from the leading edge 242 to the trailing edge 244.

Figure 4:
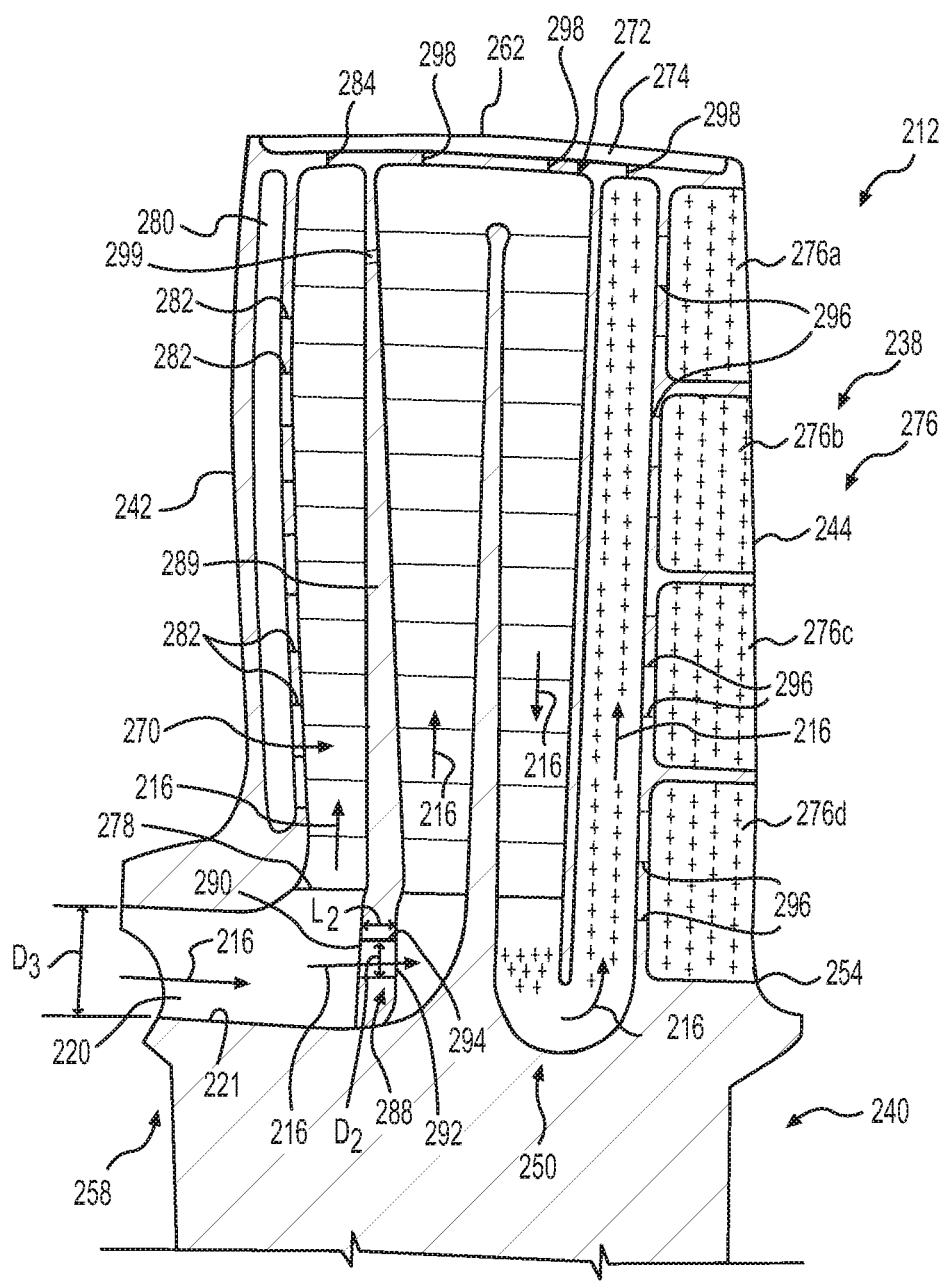
FIG. 4 is a cross-sectional view of the turbine blade of FIG. 3, taken along a surface intersecting the camber line of the turbine airfoil at all radial spans.

The cooling passage 250 is defined within the root 240 and the airfoil 238 to direct cooling fluid through the blade 212. Generally, the cooling passage 250 is defined wholly or entirely within the blade 212. With reference to FIG. 4, the cooling passage 250 is shown in greater detail. In this example, the cooling passage 250 includes the inlet 220, a first, leading cooling passage 270, a second, secondary cooling passage 272, a third, tip plenum 274 and at least one fourth, trailing cooling passage 276. Each of the cooling passages 270-276 receive the cooling fluid 216 from the inlet 220 and cooperate to cool the blade 212. It should be noted that although while not illustrated herein for clarity, the airfoil 238 generally includes a plurality of film cooling holes over an exterior surface of the airfoil 238 to direct cooling fluid over the exterior surface of the airfoil 238.

The leading cooling passage 270 is defined along the first side 258 of the root 240 and adjacent to the leading edge 242 of the airfoil 238. The leading cooling passage 270 has an inlet 278. The inlet 278 is downstream from the inlet 220 and is in fluid communication with the inlet 220 to receive the cooling fluid 216. In certain embodiments, the leading cooling passage 270 is also in fluid communication with a leading edge cooling passage 280 via a plurality of conduits 282. The leading edge cooling passage 280 receives a portion of the cooling fluid 216 from the leading cooling passage 270 via the conduits 282 to assist in further cooling the leading edge 242 of the airfoil 238. The leading cooling passage 270 also includes a conduit 284 defined near the tip portion 262, which is in fluid communication with the tip plenum 274. Thus, the conduit 284 directs a portion of the cooling fluid 216 from the leading cooling passage 270 to the tip plenum 274 to cool the tip portion 262 of the blade 212.

The secondary cooling passage 272 is defined through the airfoil 238 and the root 240 so as to be downstream from the leading cooling passage 270, between the leading cooling passage 270 and the trailing edge 244 of the blade 212. In this example, the secondary cooling passage 272 comprises a serpentine passage. In other examples, the secondary cooling passage 272 comprises a radial passage. The secondary cooling passage 272 is in fluid communication with an integral flow meter 288 to receive the cooling fluid 216. In this regard, the flow meter 288 is defined through a portion of the airfoil 238 between the leading cooling passage 270 and the secondary cooling passage 272 to supply the secondary cooling passage 272 with a predefined amount of the cooling fluid 216. In one example, the flow meter 288 comprises a bore defined through a dividing wall 289 of the airfoil 238 that has a predetermined diameter to direct a particular flow rate of the cooling fluid 216 into the secondary cooling passage 272. The dividing wall 289 separates the leading cooling passage 270 from the secondary cooling passage 272, and is defined within the airfoil 238. In one embodiment, there may be two cooling passages and one flow meter 288. In other embodiments there may be more than two cooling passages and more than one flow meter 288.

Figure 5:
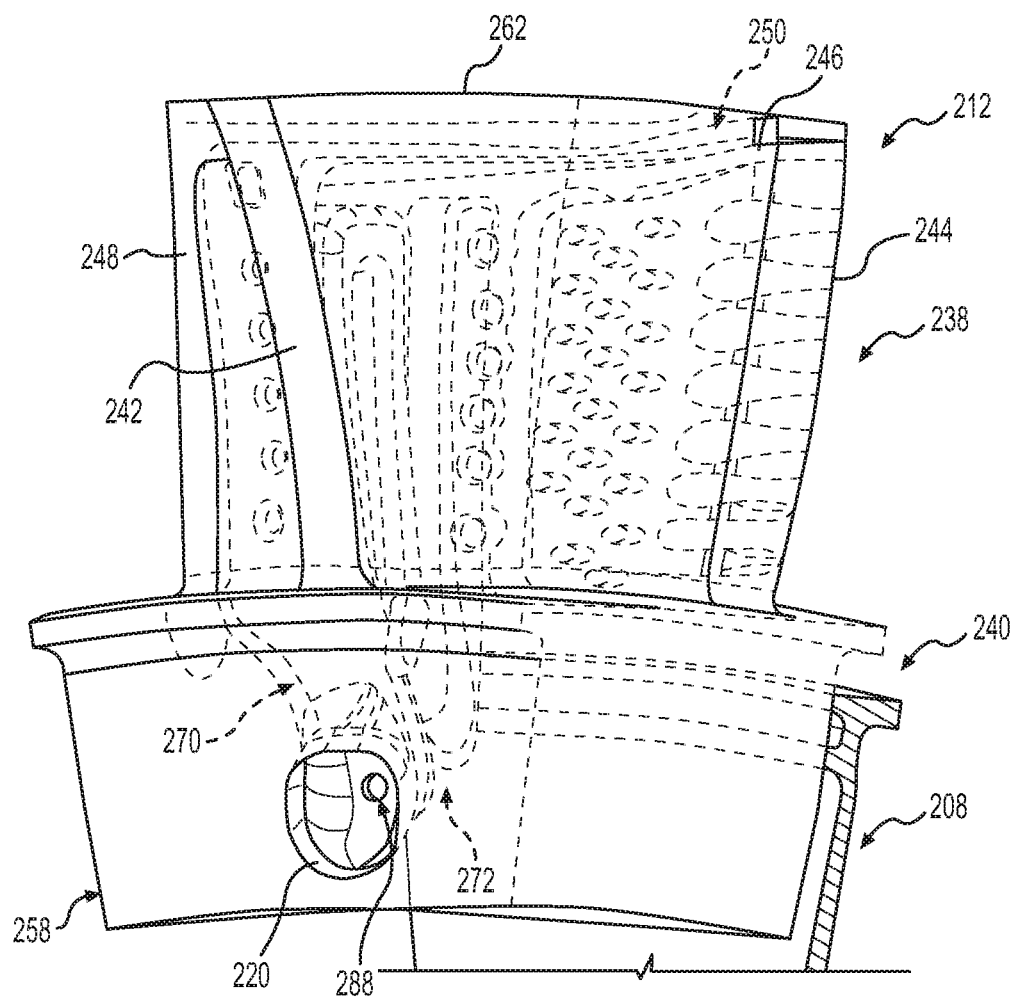
FIG. 5 is a front perspective view of the turbine blade of FIG. 2, with the forward seal plate removed to illustrate the integral flow meter.

While the flow meter 288 is illustrated herein as having a diameter $D_2$ that is substantially the same over a length $L2$ of the flow meter 288, the flow meter 288 can have a diameter that varies over the length $L2$ of the integral flow meter 288. Moreover, while the flow meter 288 is illustrated herein as comprising a cylindrical bore (FIG. 5), the flow meter 288 can be formed with any desired shape, such as elliptical, triangular, etc. Further, with reference to FIG. 2, while the flow meter 288 is illustrated herein as being defined along an axis $A_2$ substantially parallel to the longitudinal axis 140 of the gas turbine engine, the flow meter 288 can be defined along an axis that is transverse to or oblique to the longitudinal axis 140. The cross sectional flow area of the meter restricts the flow, and is sized based on the needs of the cooling circuit(s), in this example, the secondary cooling passage 272. Generally, the area of the flow meter 288 is directly proportional to a flow rate of the cooling fluid 216 that is supplied to the secondary cooling passage 272. In the example of a cylindrical bore for the flow meter 288, the cross-sectional area of the flow meter 288 is defined as:

$$A = \pi \left(\frac{D_2}{2}\right)^2 \quad (1)$$

Wherein, $D_2$ is the diameter of the flow meter 288. With reference back to FIG. 4, the flow meter 288 includes a flow meter inlet 290 and a flow meter outlet 292. The flow meter inlet 290 is in fluid communication with the inlet 220 to receive the cooling fluid 216, and the flow meter outlet 292 is in fluid communication with a secondary passage inlet 294 to provide the secondary cooling passage 272 with the cooling fluid 216. Thus, in one embodiment, the flow meter 288 is the primary supply or source of cooling fluid 216 into the secondary cooling passage 272. Stated another way, the flow meter 288 controls substantially a majority of the flow of the cooling fluid 216 into the secondary cooling passage 272, as the secondary cooling passage 272 is divided from the leading cooling passage 270 by the dividing wall 289 and is not in direct fluid communication with the leading cooling passage 270. Rather, the secondary passage inlet 294 of the secondary cooling passage 272 is primarily in fluid communication with the flow meter 288, and secondarily in fluid communication with the leading cooling passage 270 at a secondary location 299. Generally, the flow meter 288 provides about 60% to about 100% of the flow of the cooling fluid 216 into the secondary cooling passage 272, while the secondary location 299 provides about 0% to about 40% of the flow of the cooling fluid 216 into the secondary cooling passage 272. In one embodiment, the flow meter 288 controls all of the flow of the cooling fluid 216 at a first location between the leading cooling passage 270 and the secondary cooling passage 272, but the leading cooling passage 270 and the secondary cooling passage 272 may communicate at other locations, which are spaced apart from the first location. As will be discussed, the flow meter 288 can be machined to control an amount or flow rate of the cooling fluid 216 received into the secondary cooling passage 272.

Although the flow rate through the flow meter 288 is generally proportional to the cross-sectional area of the flow meter 288, the flow rate is also a function of aerodynamic flow characteristics within the metering hole that is the flow meter 288. Because these flow characteristics can be affected by the metering hole inlet and exit geometries, the flow rate through the flow meter 288 can also be affected by these geometries. The aerodynamic flow characteristics are generally quantified as the hole flow, or discharge, coefficient where the flow rate is directly proportional to the flow coefficient. Thus, flow rate can also be modified by changes to the shape of the flow meter inlet 290 or flow meter outlet 292 of the flow meter 288, in addition to the area of the hole that is the flow meter 288. In this embodiment, the flow rate through the metering hole that is the flow meter 288 can be both increased and reduced depending upon the cooling requirements for the secondary cooling passage 272.

For example, by making the inlet geometry of the flow meter 288 near or at the flow meter inlet 290 the shape of a bellmouth in the cast form, one can ensure the flow coefficient is relatively high. However, if one were to remove the bellmouth shape that were cast and machine a smaller inlet fillet radius at the inlet 290 of the flow meter 288, the flow coefficient could be reduced. Similarly, by shaping the inlet 220 and/or the region adjacent to the inlet 220 as needed, the cooling fluid 216 would interact with the metering location or the flow meter 288 in a manner that would either increase or decrease, as intended, the flow coefficient. In this example, a passage 221 between the inlet 220 of the blade 212 and the metering location or flow meter 288 is treated as a single inlet to the flow meter 288 for metering of the cooling fluid 216. Therefore, any modification to this geometry has the potential to increase or decrease the flow rate of the flow meter 288. For example, one or more disruptive features can be cast or machined within the passage 221 to disrupt the flow of the cooling fluid 216 into the flow meter 288. These modifications can be modeled with fluid dynamics based computation modeling or empirically derived through testing. Thus, the geometry of the inlet 290 of the flow meter 288, the geometry of the inlet 220 and the geometry of the passage 221 can each be modified, via machining or casting, in a predetermined manner to change a flow coefficient through the flow meter 288, and thereby increase or decrease a flow rate of the cooling fluid 216 that is the primary source of the cooling fluid 216 supplied to the secondary cooling passage 272. In addition, the flow meter outlet 292 of the flow meter 288 can be machined to change the flow coefficient, and thus, the flow rate through the flow meter 288 as determined by the fluid dynamics based computation modeling or testing.

The secondary cooling passage 272 also includes one or more trailing conduits 296 downstream from the secondary passage inlet 294 and one or more tip conduits 298. The trailing conduits 296 direct a portion of the cooling fluid 216 from the secondary cooling passage 272 to the at least one trailing cooling passage 276. The tip conduits 298 direct a portion of the cooling fluid 216 from the secondary cooling passage 272 to the tip plenum 274.

The tip plenum 274 is in fluid communication with the conduit 284 of the leading cooling passage 270 and the tip conduits 298 of the secondary cooling passage 272 to receive the portion of the cooling fluid 216. The tip plenum 274 generally extends along the tip portion 262 from the leading edge 242 to the trailing edge 244 to cool the tip portion 262 of the airfoil 238.

At least one trailing cooling passage 276 is in fluid communication with the secondary cooling passage 272 via the trailing conduits 296. In this example, the at least one trailing cooling passage 276 comprises four trailing flow passages 276a-d, which are each in fluid communication with one or more of the trailing conduits 296 to receive the cooling fluid 216. Each of the trailing flow passages 276a-d receive the cooling fluid 216 from the secondary cooling passage 272 to cool the airfoil 238 along the trailing edge 244. Thus, generally, the trailing flow passages 276a-d are defined within the airfoil 238 along the trailing edge 244 from the tip portion 262 to the bottom surface 254.

With reference to FIG. 2, the forward seal plate 206 defines the inlet 218 at a distal end 300 and is coupled to the first side 258 of the blade 212 at a proximal end 302. The distal end 300 can also define a first plurality of sealing teeth 304 and a second plurality of sealing teeth 306. The sealing teeth 304, 306 extend outwardly from the forward seal plate 206 and seal against adjacent structures within the gas turbine engine 100 to ensure that a substantial majority of the cooling fluid 216 is directed into the inlet 218. The proximal end 302 defines a groove 308, which receives a sealing member 310. The sealing member 310 seats against the first side 258 and forms a seal that substantially prevents leakage of the cooling fluid 216 from the cooling fluid plenum 210.

The rear seal plate 208 is coupled to the second side 260 of the blade 212 at a proximal end 312, and is coupled to an adjacent forward seal plate (not shown) at a distal end 314. The proximal end 312 defines a groove 316, which receives a second sealing member 318. The second sealing member 318 seats against the second side 260 and forms a seal that substantially prevents leakage of a cooling fluid for an adjacent rotor (not shown). The distal end 314 defines a passage 320 for cooling fluid for the adjacent rotor, and can also define one or more sealing fins 322 that extend outwardly from the rear seal plate 208. The sealing fins 322 seal against adjacent structures within the gas turbine engine 100 to ensure that a substantial majority of the cooling fluid for the adjacent rotor is directed from the passage 320 into the corresponding inlet for the cooling passage of the adjacent rotor. The forward seal plate 206 and the rear seal plate 208 can be composed of any suitable material, such as a metal or metal alloy.

Figure 6:
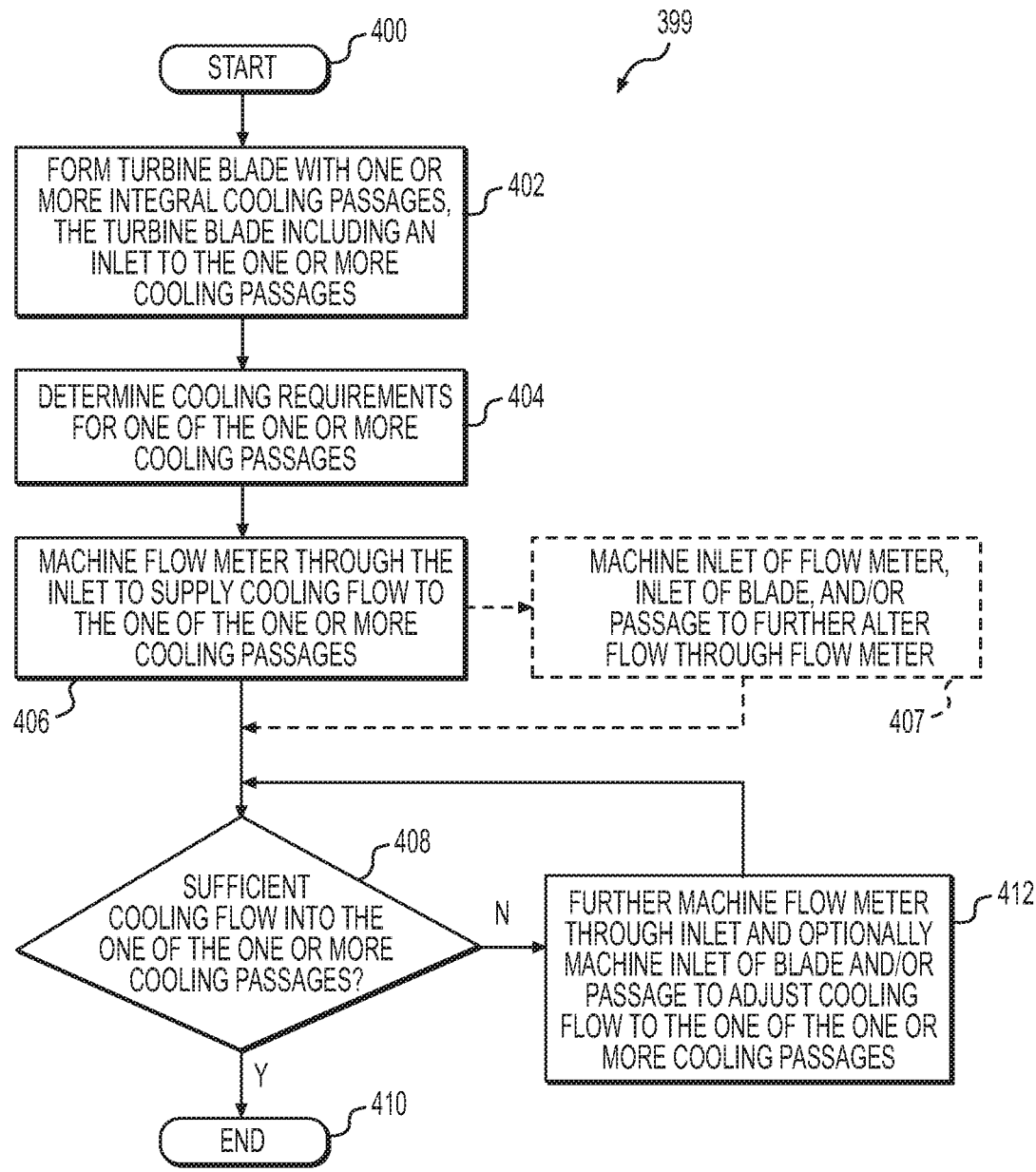
FIG. 6 is a flow chart illustrating an exemplary method of manufacturing the turbine blade of FIG. 2.

With reference to FIG. 6, and with continued reference to FIGS. 1-5, in accordance with one example, a method 399 of manufacturing the blade 212 with the flow meter 288 is shown. The method begins at 400. At 402, the blade 212 is formed. In one example, the blade 212 is formed using investment casting. In this example, a core is formed from a ceramic material, which may be cast, molded, or manufactured from a ceramic using ceramic additive manufacturing or selective laser sintering. Generally, the core comprises the inverse of the cooling passage 250 shown in FIG. 4 without the flow meter 288. Stated another way, the core comprises the inlet 220, the leading cooling passage 270, the secondary cooling passage 272, the tip plenum 274 and the at least one trailing cooling passage 276, but does not include the flow meter 288. With the core formed, the core is positioned within a die. With the core positioned within the die, the die is injected with liquid wax such that liquid wax surrounds the core. A wax sprue or conduit may also be coupled to the core within the die to aid in the formation of the blade 212. Once the wax has hardened to form a wax pattern, the wax pattern is coated or dipped in ceramic to create a ceramic mold about the wax pattern. After coating the wax pattern with ceramic, the wax pattern may be subject to stuccoing and hardening until the ceramic mold has reached the desired thickness.

With the ceramic mold at the desired thickness, the wax is heated to melt the wax out of the ceramic mold. With the wax melted out of the ceramic mold, voids remain surrounding the core. The ceramic mold is filled with molten metal or metal alloy. In one example, the molten metal is poured down an opening created by the wax sprue. Once the metal or metal alloy has solidified, the ceramic is removed from the metal or metal alloy, through chemical leaching, for example, leaving the cooling passage 250 formed in the metal or metal alloy, as illustrated in FIG. 4.

It should be noted that alternatively the blade 212 may be formed using conventional dies with one or more portions of the cooling passage 250 (or portions adjacent to the cooling passage 250) comprising a fugitive core insert.

With the blade 212 formed, at 404, the cooling requirements for the secondary cooling passage 272 are determined. In one example, the cooling requirements are pre-defined, via a fluid dynamics analysis performed using a computer model of the blade 212. In other embodiments, the cooling requirements are pre-defined based on experimental testing and simulation. In still other embodiments, the cooling requirements are defined based on a regulation from one or more governing agencies.

At 406, the flow meter 288 is machined through the inlet 220 of the blade 212. In this regard, given the determined cooling requirements for the secondary cooling passage 272, the flow meter 288 is defined through the inlet 220 to fluidly couple the inlet 220 to the secondary cooling passage 272. In this example, with reference to FIG. 4, the inlet 220 has a diameter $D_3$, which is sized to enable a tool to be inserted into the inlet 220 to form or define the flow meter 288. Generally, the diameter $D_3$ of the inlet 220 is greater than the diameter $D_2$ of the flow meter 288. In one example, the flow meter 288 is machined through the dividing wall 289 by drilling, grinding and/or milling the bore that defines the flow meter 288 through the dividing wall 289. In other embodiments, the flow meter 288 is formed by electrical discharge machining (EDM). With reference to FIG. 6, optionally at 407, one or more of the geometry of the flow meter inlet 290 of the flow meter 288, the flow meter outlet 292 of the flow meter 288, the geometry of the inlet 220 and the geometry of the passage 221 are machined, via EDM for example, to change the flow coefficient through the flow meter 288, and thereby increase or decrease a flow rate of the cooling fluid 216 that is the primary source of the cooling fluid 216 supplied to the secondary cooling passage 272.

With continued reference to FIG. 6, at 408, it is determined whether there is sufficient cooling flow into the secondary cooling passage 272. In one example, this determination can be made by testing the blade 212 in a test rig, in which a cooling flow through the blade 212, including the secondary cooling passage 272, is measured. In another example this determination may be made by dimensional inspection of the flow meter 288 and the inlet 220.

Based on the determination at 408, if the secondary cooling passage 272 is receiving the desired amount of the cooling fluid 216 from the flow meter 288, at 410, the method ends. Otherwise, at 412, the flow meter 288 is further machined through the inlet 220, the inlet 220 is further machined and/or the passage 221 is further machined to adjust the cooling fluid 216 supplied to the secondary cooling passage 272. In one example, the diameter $D_2$ of the bore of the flow meter 288 is enlarged to increase the flow rate of the cooling fluid 216 to the secondary cooling passage 272; however, one or more of the inlet 290, the outlet 292, the inlet 220 of the blade 212 and the passage 221 can be modified to reduce the flow rate of the cooling fluid 216 to the secondary cooling passage 272. The method proceeds back to 408.

The method of FIG. 6 can be repeated to form any number of blades 212 for use with the turbine rotor 224. With the desired number of blades 212 formed, the blades 212 are consolidated into a ring, and coupled together through any conventional technique to form a blade ring. The blade ring comprising the blades 212 is coupled to the hub 226 to form the turbine rotor 224. With the turbine rotor 224 formed and assembled, the turbine rotor 224 can be installed in the gas turbine engine 100.

As each of the blades 212 of the turbine rotor 224 include the cooling passage, having the integral flow meter 288, the cooling fluid 216 is supplied to the blades 212 without requiring additional metering plates or metering components. By forming the flow meter 288 integrally with the blade 212 to provide the desired cooling flow, the amount of cooling fluid 216 used by the blade 212 substantially comports with the amount of cooling flow needed by the blade 212, thereby reducing instances where the blade 212 is receiving more cooling fluid 216 than needed, which may impact fuel consumption of the gas turbine engine 100. Moreover, the integrally formed flow meter 288 ensures the proper amount of the cooling fluid 216 is supplied to the secondary cooling passage 272 of the blade 212, thereby reducing the likelihood that the blade 212 is insufficiently cooled.

It should be noted that while the flow meter 288 is described herein as being separately defined after the formation of the blade 212, it will be understood that the present disclosure is not so limited. In this regard, the flow meter 288 can be part of the core used with the investment casting of the blade 212 such that the flow meter 288 is integrally formed or defined during the investment casting of the blade 212. In this example, the flow meter 288 defined by the investment casting can be separately machined via drilling, grinding, milling and/or EDM to tune the amount of cooling fluid 216 received by the secondary cooling passage 272 in a separate step after formation of the blade 212.

Figure 7:
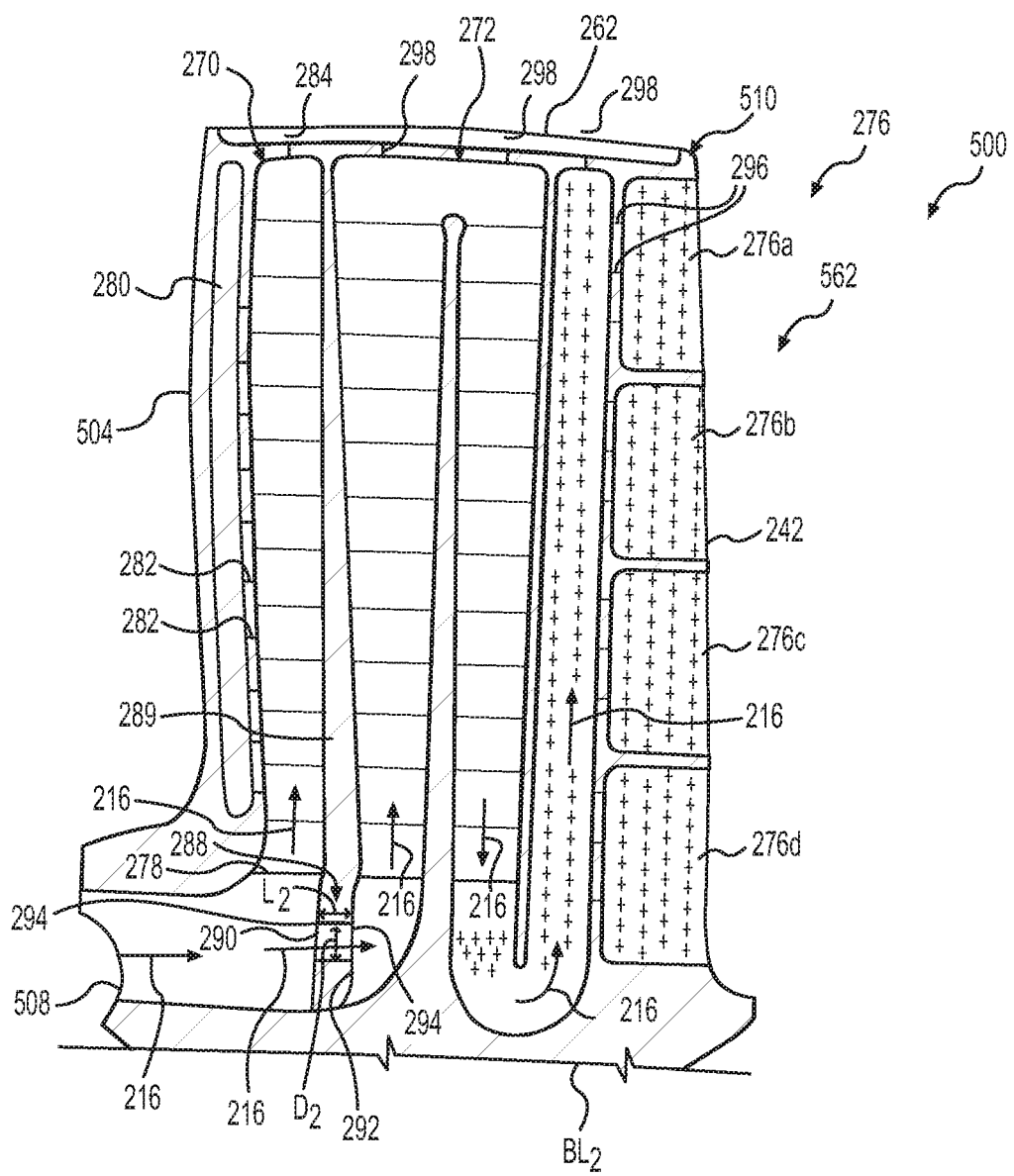
FIG. 7 is a schematic cross-sectional view of a turbine blade for an axial turbine that includes an exemplary cooling passage having the integral flow meter according to the various teachings of the present disclosure, with the cross-sectional illustration taken along a surface coincident with the camber line of the turbine airfoil at all radial spans.

It should be noted that the cooling passage 250 described with regard to FIGS. 1-6 is merely exemplary, and depending upon the shape and size of the axial turbine, the shape of the cooling passage 250 may vary. For example, with reference to FIG. 7, a cross-section of a blade 500 of an axial turbine is shown. As the blade 500 includes components that are the same or substantially similar to the blade 212 discussed with regard to FIGS. 1-6, the same reference numerals will be used herein to denote the same or similar components. In this example, the blade 500 is metallurgically bonded to an outer peripheral surface of a hub via diffusion bonding along a bond line BL2, and does not include the root 240 as discussed with regard to FIGS. 1-6.

The blade 500 includes an airfoil 502 having a leading edge 504, the trailing edge 244, the first or pressure side 246 and the second or suction side 248. In this example, due to the shape of the blade 500, an inlet 508 is defined through a portion of the airfoil 502 below the leading edge 504. Thus, in this example, the cooling fluid 216 flows axially along the high pressure shaft 134 and ultimately flows into the inlet 508 of each of the plurality of blades 500 adjacent to or near the leading edge 504. The inlet 508 provides each of the plurality of blades 500 with cooling fluid to internally cool the plurality of blades 500. At least one cooling passage 510 is defined internally within the blade 500 and is in fluid communication with the inlet 508.

The cooling passage 510 is defined within the airfoil 502 to direct cooling fluid through the blade 212. Generally, the cooling passage 510 is defined wholly or entirely within the airfoil 502. The cooling passage 510 includes the inlet 508, the leading cooling passage 270, the secondary cooling passage 272, the tip plenum 274 and the at least one trailing cooling passage 276. Each of the cooling passages 270-276 receive the cooling fluid 216 from the inlet 508 and cooperate to cool the blade 500. It should be noted that although while not illustrated herein for clarity, the airfoil 502 generally includes a plurality of film cooling holes over an exterior surface of the airfoil 502 to direct cooling fluid over the exterior surface of the airfoil 502. As the cooling passage 510, including the integral flow meter 288, is substantially the same as the cooling passage 250 and the flow meter 288 discussed with reference to FIGS. 1-6 with the exception of the location of the inlet 508, the cooling passage 510 will not be discussed in detail herein. Moreover, as the blade 500 with the integral flow meter can be formed using the method of blocks 400-412 of FIG. 6, the method of manufacturing the blade 500 will also not be discussed in detail herein.

It should be noted that the present disclosure is not limited to forward fed turbine blades 212, 500, but is equally applicable to bottom fed turbine blades as well. In this regard, with reference to FIG. 8, a bottom fed turbine blade 600 is shown. The blade 600 is coupled to a hub to form a turbine rotor (not shown), and can be used with the gas turbine engine 100 of FIGS. 1-6. The blade 600 has an airfoil 602 extending outwardly from a root 604. The airfoil 602 includes a leading edge 606, a trailing edge 608, a first or pressure side 610 and a second or suction side 612. At least one or a plurality of cooling passages 614 are defined internally within the blade 600, and each of the plurality of cooling passages 614 are in fluid communication with respective ones of a plurality of integral flow meters 616. As will be discussed, the plurality of cooling passages 614 extend from the root 604 to a tip or tip portion 618 of the airfoil 602 to direct cooling fluid through the blade 600.

A first or top surface 620 of the root 604 is coupled to the airfoil 602. A second or bottom surface 622 of the root 604 defines the plurality of flow meters 616, as will be discussed further herein. The root 604 also includes a first side 624 opposite a second side 626. The leading edge 606 of the airfoil 602 extends from the tip portion 618 to the top surface 620 of the root 604. The trailing edge 608 comprises the distalmost portion of the airfoil 602. The pressure side 610 is substantially opposite the suction side 612. Each of the pressure side 610 and the suction side 612 extend along the airfoil 602 from the leading edge 606 to the trailing edge 608.

The plurality of cooling passages 614 are defined within the root 604 and the airfoil 602 to direct cooling fluid through the blade 600. Generally, the plurality of cooling passages 614 are defined wholly or entirely within the blade 600. In this example, the plurality of cooling passages 614 include a first cooling passage 614a, a second cooling passage 614b, a third cooling passage 614c and a fourth cooling passage 614d. It will be understood, however, that the blade 600 can include more or less cooling passages, if desired. Each of the cooling passages 614a-d receive the cooling fluid 216 from a respective inlet 619a-e, and each of the plurality of flow meters 616a-e are defined at the respective inlet 619a-e that supplies the cooling fluid 216 to the respective one of the plurality of cooling passages 614a-d. It should be noted that although while not illustrated herein for clarity, the airfoil 602 generally may include a plurality of film cooling holes over an exterior surface of the airfoil 602 to direct cooling fluid over the exterior surface of the airfoil 602.

The first cooling passage 614a is adjacent to the leading edge 606 and includes a first branch 628 and a second branch 629 that merge into a main branch 631. The first branch 628 and the second branch 629 are defined in the root 604, and merge into the main branch 631 adjacent to the top surface 620 of the root 604 such that the main branch 631 extends through the airfoil 602. The first branch 628 and the second branch 629 each receive the cooling fluid 216 from a respective one of the plurality of flow meters 616, such as flow meter 616a, 616b. Each of the second cooling passage 614b, the third cooling passage 614c and the fourth cooling passage 614d extend from the root 604 to the tip portion 618 of the airfoil 602, and are each in fluid communication with a respective one of the plurality of flow meters 616, for example, flow meter 616c, flow meter 616d and flow meter 616e, respectively.

Each of the plurality of flow meters 616a-e is formed within or defined in the bottom surface 622 of the root 604 about a respective one of the inlets 619a-e to supply each of the plurality of cooling passages 614a-d with a predefined amount of the cooling fluid 216. In one example, each of the plurality of flow meters 616a-e comprise a volume of additional material M defined about the respective inlet 619a-e that is able to be machined to a predetermined diameter to direct a particular flow rate of the cooling fluid 216 into the respective one of the plurality of cooling passages 614a-d. The additional material M may cover about 10% to about 100% of the area of the inlet 619a-e prior to machining the additional material M at the respective inlet 619a-e to achieve the final configuration for the respective inlet 619a-e that corresponds to the predetermined flow requirement for the particular cooling passage 614a-d. While each of the plurality of flow meters 616a-e are illustrated herein as having a thickness $D_6$ (i.e. $(D_5-D_4)/2$) that is substantially the same over a height $h_4$ of the flow meters 616a-e, the plurality of flow meters 616a-e can have a diameter that varies over the height $h_4$ of the plurality of flow meters 616a-e. Generally, each of the plurality of flow meters 616a-e are defined with the diameter $D_6$, which can be machined in various amounts to create the respective inlet 619a-e with a diameter as needed for the selected amount of the cooling fluid 216. Stated another way, each of the plurality of flow meters 616a-e can be initially defined as the additional material M that surrounds the respective inlets 619a-e with the diameter $D_4$, and the additional material M surrounding each of the inlets 619a-e can be machined up to a diameter $D_5$ as needed to provide a predetermined amount of the cooling fluid 216 to the respective one of the plurality of cooling passages 614a-d.

Moreover, while the plurality of flow meters 616a-e are illustrated herein as being machinable into a cylindrical bore, the plurality of flow meters 616a-e can be formed with any desired shape, such as elliptical, triangular, etc. Further, while the plurality of flow meters 616a-e are illustrated herein as being defined along an axis $A_4$ substantially perpendicular to the longitudinal axis 140 of the gas turbine engine, the additional material M of the plurality of flow meters 616a-e can be defined along an axis that is transverse to or oblique to the longitudinal axis 140. In addition, while each of the plurality of flow meters 616a-e are illustrated as having substantially the same size and shape (i.e. the same diameter $D_6$ and the same height $h_4$), one or more of the plurality of flow meters 616a-e can have a different shape, diameter and/or height. Generally, the cross-sectional area of each of the inlets 619a-e is directly proportional to the flow rate of the cooling fluid 216 that is supplied to the respective ones of the plurality of cooling passages 614a-d. In the example of a cylindrical bore for each of the plurality of flow meters 616a-e, the cross-sectional flow area of a single one of the inlets is defined as:

$$A = \pi\left(\frac{D_4}{2}\right)^2 \quad (1)$$

Each of the plurality of flow meters 616a-e includes a flow meter inlet 630a-e and a flow meter outlet 632a-e. The respective flow meter inlet 630a-e is in fluid communication with the cooling fluid 216 at the respective inlet 619a-e, and the respective flow meter outlet 632a-e is in fluid communication with the respective one of the plurality of cooling passages 614a-d. The respective one or more of the plurality of flow meters 616a-e cooperate with the respective inlet 619a-e to control all of the flow of the cooling fluid 216 into the respective one of the plurality of cooling passages 614a-d. As will be discussed, the additional material M can be machined to control an amount or flow rate of the cooling fluid 216 received into the respective one of the plurality of cooling passages 614a-d at the respective inlet 619a-e. In one example, the flow rate may be reduced in the flow meters 616a-e by modifying the inlet 619a-e at the bottom surface 622. In this regard, one or more fillets, bumps or contours may be defined on the bottom surface 622 adjacent to, near or around one or more of the inlets 619a-e to alter the flow through the respective flow meters 616a-e.

Figure 8:
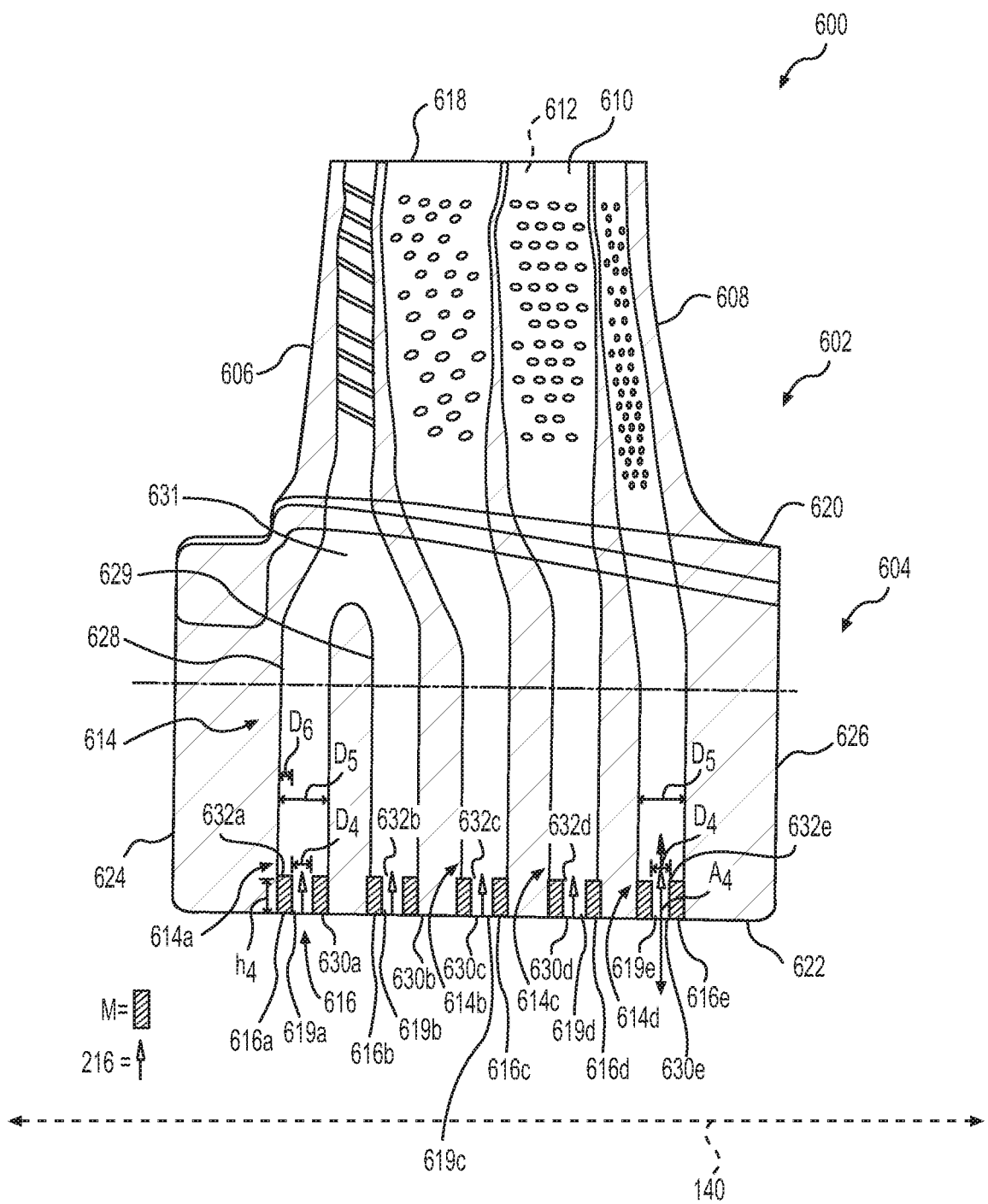
FIG. 8 is a schematic cross-sectional view of a turbine blade for an axial turbine that includes an exemplary cooling passage having an integral flow meter according to the various teachings of the present disclosure with the cross-sectional illustration taken along a surface coincident with the camber line of the turbine airfoil at all radial spans.
Figure 9:
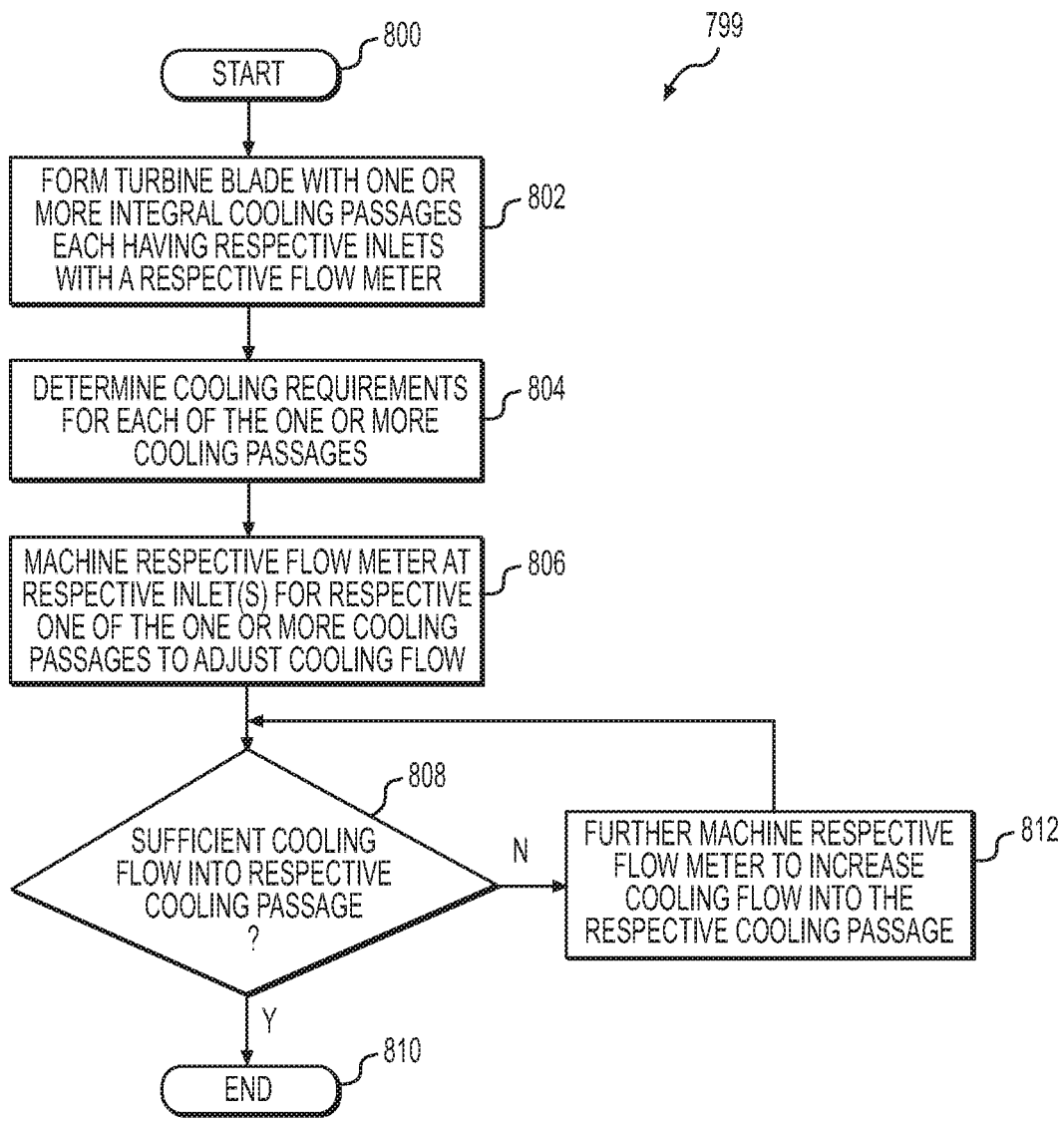
FIG. 9 is a flow chart illustrating an exemplary method of manufacturing the turbine blade of FIG. 8.

With reference to FIG. 9, and with continued reference to FIG. 8, in accordance with one example, a method 799 of manufacturing the blade 600 with the plurality of flow meters 616a-e is shown. The method begins at 800. At 802, the blade 600 is formed. In one example, the blade 600 is formed using investment casting, as discussed with regard to FIG. 6, above. As the remainder of the investment casting process for the blade 600 is substantially similar to the process discussed with regard to FIG. 6, the method of investment casting the blade 600 will not be discussed in great detail herein. Briefly, however, the core that is formed in investment casting the blade 600 comprises the inverse of the plurality of cooling passages 614a-d, including the extra material M of the plurality of flow meters 616a-e that surrounds each of the inlets 619a-e. With the core positioned within the die, the die is injected with liquid wax such that liquid wax surrounds the core. Once the wax has hardened to form a wax pattern, the wax pattern is coated or dipped in ceramic to create the ceramic mold about the wax pattern. With the ceramic mold at the desired thickness, the wax is heated to melt the wax out of the ceramic mold. The ceramic mold is filled with molten metal or metal alloy. Once the metal or metal alloy has solidified, the ceramic is removed from the metal or metal alloy, through chemical leaching, for example, leaving the plurality of cooling passages 614a-d, including the extra material M surrounding each of the inlets 619a-e of the plurality of cooling passages 614a-d formed in the metal or metal alloy.

It should be noted that alternatively the blade 600 may be formed using conventional dies with one or more portions of the plurality of cooling passages 614a-d, including the extra material M surrounding each of the inlets 619a-e (or portions adjacent to the plurality of cooling passages 614a-d) comprising a fugitive core insert.

With the blade 600 formed, at 804, the cooling requirements for each of the plurality of cooling passages 614a-d are determined. In one example, the cooling requirements are pre-defined, via a fluid dynamics analysis performed using a computer model of the blade 600. In other embodiments, the cooling requirements are pre-defined based on experimental testing and simulation. In still other embodiments, the cooling requirements are defined based on a regulation from one or more governing agencies.

At 806, based on the determination at 804, the additional material M of one or more of the plurality of flow meters 616a-e is machined to adjust the amount or flow rate of the cooling fluid 216 received by the particular one of the plurality of cooling passages 614a-d at the respective inlet 619a-e. In this regard, given the determined cooling requirements for each of the plurality of cooling passages 614a-d, the additional material M is removed, if necessary, to provide for a greater flow rate of the cooling fluid 216 to enter the respective one of the plurality of cooling passages 614a-d at the respective inlet 619a-e. In one example, the additional material M of the plurality of flow meters 616a-e is machined by drilling, grinding and/or milling about the respective one of the inlets 619a-e. In other embodiments, the additional material M is removed by electrical discharge machining (EDM).

With continued reference to FIG. 9, at 808, it is determined whether there is sufficient cooling flow into each of the plurality of cooling passages 614*a-d*. In one example, this determination can be made by testing the blade 600 in a test rig, in which a cooling flow through the blade 600, including the plurality of cooling passages 614*a-d*, is measured. It may also be determined through dimensional inspection.

Based on the determination at 808, if each of the plurality of cooling passages 614*a*-d are receiving the desired amount of the cooling fluid 216 from the respective ones of the inlets 619*a-e*, at 810, the method ends. Otherwise, at 812, the additional material M of respective ones of the plurality of flow meters 616*a-e* is further removed by machining to increase the cooling fluid 216 flow rate supplied to the respective ones of the plurality of cooling passages 614*a-d*. The method proceeds back to 808.

The method of FIG. 9 can be repeated to form any number of blades 600 for use with a turbine rotor of the gas turbine engine 100. With the desired number of blades 600 formed, the blades 600 are consolidated into a ring, and coupled together to form a blade ring, which is coupled to the hub of the turbine rotor as discussed above with regard to the blades 212. With the turbine rotor formed and assembled, the turbine rotor can be installed in the gas turbine engine 100.

As each of the blades 600 include the plurality of cooling passages 614*a-d*, each having one or more of the plurality of integral flow meters 616*a-e*, the cooling fluid 216 is supplied to the blades 600 without requiring additional metering plates or metering components. By forming the plurality of flow meters 616*a-e* integrally with the blade 600 with the additional material M, one or more of the plurality of flow meters 616*a-e* can be machined to remove portions of the additional material M to adjust the cooling fluid 216 individually for each of the plurality of cooling passages 614*a-d*. This adjustability reduces instances where one or more of the plurality of cooling passages 614*a-d* is receiving more cooling fluid 216 than needed, which may impact fuel consumption of the gas turbine engine 100. Moreover, the plurality of flow meters 616*a-e* having the additional material M which is removable ensures the proper amount of the cooling fluid 216 is supplied to each of the plurality of cooling passages 614*a-d* of the blade 600, thereby reducing the likelihood that the blade 600 is insufficiently cooled.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine blade, comprising:
 an airfoil extending outwardly from a root, the airfoil having a trailing edge, and a leading edge opposite the trailing edge, the root having a forward side and an aft side;
 at least one cooling passage defined internally within the turbine blade, the at least one cooling passage in fluid communication with a source of cooling fluid via an inlet to receive a cooling fluid, the inlet defined in the forward side of the root, and the at least one cooling passage comprises at least a first cooling passage defined along the leading edge, at least one trailing cooling passage defined along the trailing edge and a second cooling passage defined between the first cooling passage and the at least one trailing cooling passage, the first cooling passage separated from the second cooling passage by a dividing wall defined within the airfoil;
 at least one flow meter defined through the dividing wall downstream of the inlet, the at least one flow meter in fluid communication with the inlet and the second cooling passage, and configured to supply the cooling fluid to the second cooling passage; and
 a secondary location defined through the dividing wall downstream of the at least one flow meter in fluid communication with the first cooling passage and the second cooling passage that is configured to supply the cooling fluid to the second cooling passage.

2. The turbine blade of claim 1, wherein the at least one flow meter is a bore defined through the dividing wall, and the at least one flow meter has a flow meter inlet in fluid communication with the inlet and a flow meter outlet in fluid communication with a second passage inlet of the second cooling passage to supply the second cooling passage with the cooling fluid.

3. The turbine blade of claim 2, wherein the second cooling passage is a serpentine cooling passage.

4. The turbine blade of claim 2, wherein the inlet has a first diameter, the at least one flow meter has a second diameter, and the first diameter is greater than the second diameter.

5. The turbine blade of claim 1, wherein the at least one flow meter is the primary supply of the cooling fluid for the second cooling passage.

6. A method of manufacturing a turbine blade, comprising:
 forming the turbine blade with at least one integral cooling passage, the turbine blade including an airfoil extending outwardly from a root, the airfoil having a trailing edge and a leading edge opposite the trailing edge, the root having a forward side and an aft side, the at least one cooling passage defined internally within the turbine blade, the at least one cooling passage having an inlet in fluid communication with a source of a cooling fluid, the inlet defined in the forward side of the root, and the at least one cooling passage comprises at least a first cooling passage defined along the leading edge, at least one trailing cooling passage defined along the trailing edge and a second cooling passage defined between the first cooling passage and the at least one trailing cooling passage, the first cooling passage separated from the second cooling passage by a dividing wall defined within the airfoil; and
 machining at least one flow meter through the dividing wall downstream of the inlet to adjust a flow of the cooling fluid into the second cooling passage based on a determined cooling requirement for the second cooling passage, the at least one flow meter in fluid communication with the inlet and the second cooling passage to supply the cooling fluid to the second cooling passage, and the dividing wall including a secondary location defined through the dividing wall downstream of the at least one flow meter in fluid communication with the first cooling passage and the second cooling passage to supply the cooling fluid to the second cooling passage.

7. The method of claim 6, wherein the forming the turbine blade further comprises:

forming the second cooling passage as a serpentine cooling passage, and the at least one flow meter is the primary supply of the cooling fluid to the serpentine cooling passage.

8. A turbine blade, comprising:

an airfoil extending outwardly from a root, the airfoil having a trailing edge, a leading edge opposite the trailing edge, the root having a forward side opposite an aft side;

at least a first cooling passage, a second cooling passage and at least a trailing cooling passage defined internally within the turbine blade, the first cooling passage in fluid communication with a source of cooling fluid via an inlet defined in the turbine blade to receive a cooling fluid, the first cooling passage defined along the leading edge, the at least one trailing cooling passage defined along the trailing edge and the second cooling passage defined between the first cooling passage and the at least one trailing cooling passage, the first cooling passage separated from the second cooling passage by a dividing wall defined within the airfoil, and the inlet is defined in the forward side of the root;

at least one flow meter defined through the dividing wall downstream of the inlet, the at least one flow meter has a flow meter inlet in fluid communication with the inlet and a flow meter outlet in fluid communication with a second passage inlet of the second cooling passage, and the at least one flow meter is configured to supply the cooling fluid to the second cooling passage; and a secondary location defined through the dividing wall downstream of the at least one flow meter in fluid communication with the first cooling passage and the second cooling passage that is configured to supply the cooling fluid to the second cooling passage.

9. The turbine blade of claim 8, wherein the at least one flow meter is the primary supply of the cooling fluid to the second cooling passage, the at least one flow meter is configured to supply at least 60% of the cooling fluid to the second cooling passage and the secondary location is configured to supply up to 40% of the cooling fluid to the second cooling passage.

10. The turbine blade of claim 8, wherein the at least one flow meter is a bore defined through the dividing wall.

11. The turbine blade of claim 8, wherein the second cooling passage is a serpentine cooling passage.

* * * * *